United States Patent [11] 3,534,777

[72] Inventor Nils O. T. Loof
 Gullspang, Sweden
[21] Appl. No. 738,332
[22] Filed June 19, 1968
[45] Patented Oct. 20, 1970
[32] Priority June 20, 1967
[33] Sweden
[31] 8756/67
 Continuation-in-part of application Ser. No.
 419,420, Dec. 18, 1964, now Patent No.
 3,487,574. This application June 19, 1968,
 Ser. No. 738,332

[54] MARKING SLEEVE
 12 Claims, 9 Drawing Figs.

[52] U.S. Cl. .................................................. 138/121,
 138/104, 138/119, 40/23, 40/316, 174/112
[51] Int. Cl. ........................................................ F16l 11/12,
 G09f 3/06
[50] Field of Search .......................................... 138/121,
 104, 119; 174/112, 135, 136; 40/316, 23

[56] References Cited
 UNITED STATES PATENTS
 319,721 6/1885 Hudson .......................... 138/173
 2,157,564 5/1939 Peuthert ......................... 138/121
 3,201,111 8/1965 Afton ............................. 138/121X
 FOREIGN PATENTS
 1,245,026 9/1960 France ........................... 40/316

Primary Examiner—Herbert F. Ross
Attorneys—William D. Hall, Elliott I. Pollock, Fred C. Philpitt, George Vande Sande, Charles F. Steininger and Robert R. Priddy ABSTRACT: A marking sleeve for wires, conductors, cables, and the like, comprising; an expansible sleeve made of an elastic material such as a synthetic plastic, and having an annular or sleeve-type body, a generally flat, outer top portion adapted to be embossed or otherwise marked with a legend, a bottom portion having at least one fold, loop or bellows-like wall protruding inwardly, and at least one saddle-like seat, depression or valley formed on the inner wall of the sleeve by inwardly projecting, ridges, flanges or the like and adapted to frictionally engage the wire, etc., when the marking sleeve is passed over the wire, etc.

MARKING SLEEVE

This is a continuation-in-part of application Ser. No. 419,420, filed Dec. 18, 1964, now U.S. Pat. No. 3,487,574, by the present applicant.

BACKGROUND OF THE INVENTION

The present invention relates to a novel marking device for wires, conductors, cables and the like, which is adapted to expand and thereby fit a wide range of diameters of such wires, conductors, cables or the like. More specifically, the present invention relates to an expansible, annular marking device adapted to be mounted on a wide range of sizes of wires, conductors, cables or the like, yet resisting relative rotation or lateral displacement on all sizes of such wires, conductors, cables, or the like.

DESCRIPTION OF THE PRIOR ART

Annular marking sleeves which are adapted to slide over a wire, conductor, cable or the like are being used at an increasing rate in the electrotechnical field. Obviously a conventional annular tube to be utilized as a marking sleeve is restricted in use to a very narrow range of wire sizes, the adaptability to use on different size wires, etc., being limited by the elasticity of the material used to form the sleeve. It is also quite obvious that such sleeves can be rotated accidentally about the wire or can become displaced along the wire when placed on a small size wire and that they will be difficult to place on the larger sized wires. The relative rotation and displacement on a small sized wire obviously decreases both the functional and aesthetic value of the marker. Generally, a legend of some type is embossed or otherwise placed on the marker and rotation or displacement will make it impossible to readily read the legend. Hence, such conventional marking sleeves are substantially limited to a single size of wire. This, of course, creates problems both for the manufacturer and the user, both of whom must handle a large number of marker sizes. It is therefore highly desirable that a marking sleeve be available which can be utilized on a wide range of wire sizes but which will, at the same time, overcome the problems of difficult mounting on the wire and accidental displacement which were pointed out above. One highly successful solution to these problems is provided in copending application Ser. No. 419,420 entitled "Expansible Sleeve" filed by the present inventor on Dec. 18, 1964, of which the present application is a continuation-in-part. In accordance with the subject application, an annular expansible marking sleeve, usable on a wide size range of wires, conductors, cables or the like, comprises a generally annular or tubular body having a laterally expansible portion formed in at least one part of the side of the body which includes at least one fold or loop extending inwardly from one side of the expansible portion. The sleeve of the prior application has been a substantial improvement over the prior art to the extent that a very few sleeve sizes are usable on wires, conductors, cables or the like having a minimum diameter of 23 mils and a maximum diameter of five-eighths inch. Over this entire diameter range, four different sizes of sleeves of the type covered by the prior application can be utilized. The obvious advantages of standardization of this type will be apparent to both the manufacturer and the user. When only four sizes of sleeves of the design set forth in the prior application are utilized, the maximum and minimum diameters represent the ultimate permissible limits of use for the sleeve from both a functional and a aesthetic point of view. When a sleeve of a given size is mounted on the cable having the smallest diameter within the range in question, there is a tendency of the sleeve to slide on the cable, to rotate relative to the cable and in some cases to be radially displaced. Accordingly, it is often difficult to read the legends marked on the sleeve and such misalignment is obviously unattractive. On the other hand, when such a sleeve is threaded on a cable having the maximum diameter within the range in question, it is often difficult to mount the sleeve on the cable. Thus, when utilized on the largest size cable, the ease of mounting is dependent to a large degree on the amount by which the folds can be deformed and by the flexibility of the material from which the sleeve is made.

SUMMARY OF THE INVENTION

It is therefore an object of the present invention to overcome the problems and inadequacies of the prior art which are pointed out above. Another object of the present invention is to provide an improved marking sleeve for wires, cables, conductors, and the like. A still further object of the present invention is to provide an improved marking sleeve for wires, cables, conductors, and the like in which a single size sleeve can be utilized effectively on a wide range of wire diameters. Yet another object of the present invention is to provide an improved marking sleeve for wires, cables, conductors and the like having a substantially reduced tendency to rotate or become longitudinally displaced on the wire, etc. Another and further object of the present invention is to provide an improved marking sleeve for wires, cables, conductors, and the like in which a single size sleeve can be utilized effectively on a wide range of wire sizes and which also has improved resistance to rotation or longitudinal slippage on the wire, etc. A still further object of the present invention is to provide an improved marking sleeve for wires, cables, conductors, and the like which can be manufactured in three basic sizes, and which can be utilized effectively on wires ranging in diameter from 23 mils to five-eighths inch. These and other objects and advantages of the present invention will be apparent from the following description.

Briefly, in accordance with the present invention, a marking sleeve for wires, cables, conductors, and the like is provided wherein a generally annular or sleeve-type body includes at least one inwardly projecting fold or loop, to permit lateral expansion of the sleeve, and at least one inwardly projecting ridge or flange element extending from the interior of the sleeve and adapted to increase frictional contact between the wire being marked and the sleeve. There are preferably at least two internally projecting flange elements forming a saddle-like seat, depression or valley and these elements are preferably mounted on the internally projecting folds or loops.

The present invention will be best understood by reference to the drawings, wherein.

FIGS. 3, 4, 5, and 6 show other embodiments of the present sleeve.

DESCRIPTION OF THE PREFERRED EMBODIMENTS

Figure 1A:
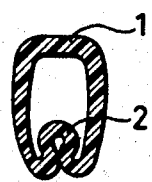
FIG. 1a shows a sleeve manufactured in accordance with prior application Ser. No. 419,420.
Figure 1B:
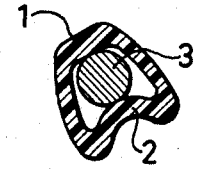
FIG. 1b shows the sleeve of FIG. 1a mounted on a cable.

In accordance with FIG. 1a and 1b, the sleeve of prior application Ser. No. 419,420 comprises; a generally annular or tubular body having a generally flat upper surface 1, upon which a marking legend is placed by embossing, printing, or other suitable technique. The lower portion of the sleeve has an inwardly protruding fold, loop or bellow-type section 2. When as shown in FIG. 1b, the sleeve is mounted on a conductor 3 of relatively small diameter, the inner surface of the fold 2 is still convex so that the bottom diverges outward from its point of contact with the conductor. It is also readily apparent from FIG. 1b that, because of the central elevation, the sleeve may easily rotate around the longitudinal axis of conductor 3, displaced longitudinally on the cable 3, or even displaced to either side of the fold. The disadvantages of such accidental displacement of the sleeve have been pointed out in the above discussion of the prior art.

Figure 2A:
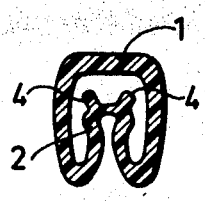
FIG. 2a shows a first embodiment of the sleeve of the present invention.
Figure 2B:
FIG. 2b shows the sleeve of FIG. 2a mounted on a small diameter cable.
Figure 2C:
FIG. 2c shows the sleeve of FIG. 2a mounted on a large diameter cable.

One embodiment of the improved marking sleeve of the present invention is shown in FIGS. 2a, 2b, and 2c of the drawings. In accordance with this series of figures, a generally annular or tubular body is provided with a generally flat upper surface 1. This upper surface is also provided for application of an appropriate legend as was pointed out with respect to FIG. 1. The sleeve of FIGS. 2a, 2b and 2c also includes an inwardly protruding fold, loop or bellows-type section 2. Fold 2 also serves essentially the same purpose as fold 2 of FIG. 1 to the extent that it permits substantial expansion of the sleeve and consequently mounting on a wide variety of cable sizes. Projecting inwardly from fold 2 are two ridges, ribs or flanges 4. When the sleeve is in its unexpanded condition, flanges 4 project inwardly with respect to the outer wall at a slight angle to thereby form a saddle, valley or generally U-shaped depression which not only will serve as a support for the cable but also will increase the frictional resistance between the conductor and the sleeve when the conductor is passed through the sleeve. The mounting of the sleeve on a small size cable 3 is shown in FIG. 2b. Here, it is obvious that the saddle or generally U-shaped depression formed by flanges 4 will laterally support and frictionally engage the small cable 3 and contribute substantially to the resistance to displacement of the sleeve. When mounted on a larger size cable 3, as shown in FIG. 2c, the cable does not necessarily fit within the saddle or U-shaped depression but yet there remains substantial lateral support and resistance to displacement of the sleeve while permitting considerable flexibility to mount and use the sleeve on even larger cables than that shown in FIG. 2c.

Figure 3:
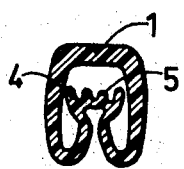

In the embodiment shown in FIG. 3, flanges 4 are present as in the embodiment of FIG. 2, but there are two inner ridges, ribs or flanges 5 mounted inside flanges 4. The inner flanges 5 are generally perpendicular to the outside wall or the loop 2 as opposed to the angular positioning of the flanges 4. The flanges 4 and 5 obviously form a cradle effect similar to the effect shown when the cable 3 is placed in the sleeve of FIG. 2c. When a cable is placed in the embodiment of FIG. 3, this cradle-type effect will occur on expansion of the sleeve so that the flanges 4 and 5 are essentially wrapped around the bottom of the cable with the flanges in edge contact with the cable.

Figure 4:

In the embodiment of FIG. 4, the same general configuration of a flat top 1, an internally projecting fold 2 and angularly disposed flanges 4 is provided. However, in addition, flanges 6 are provided in a generally radially disposed fashion so as to form an L-shape with flange 4. Obviously, upon expansion of the sleeve, flanges 6 will contact the side walls of the sleeve and improve the gripping action on smaller size cables.

Figure 5:
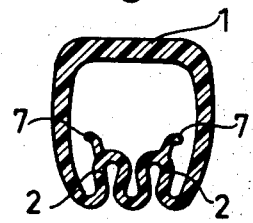

A similar improved gripping action is provided by the sleeve of FIG. 5. In the sleeve of FIG. 5, two internally projecting folds or loops 2 are provided for expansion and a pair of ridges or flanges 7 project from loops 2 inwardly and thence outwardly toward the side walls of the sleeve. Therefore, with this configuration, the same general effect as that shown in FIG. 4 may be accomplished. Specifically, upon expansion during the placement of the sleeve on a small size cable, the edges of flanges 7 will contact the side walls of the sleeve and thereby improve clamping action on the cable. By the same token, the cradle formed by the flanges 7 will increase the frictional contact between the conductor and the sleeve. On the other hand, if a large size cable is passed through the embodiment of FIG. 5, the flanges 7 will tend to turn inwardly approximately 90° and thereby increase the frictional engagement between the cable and the sleeve.

While two loops are shown in FIG. 5 and only one loop is shown in FIGS. 2 through 4, it is obvious that any of the flange configurations can be utilized on sleeves having any number of loops.

Figure 6:
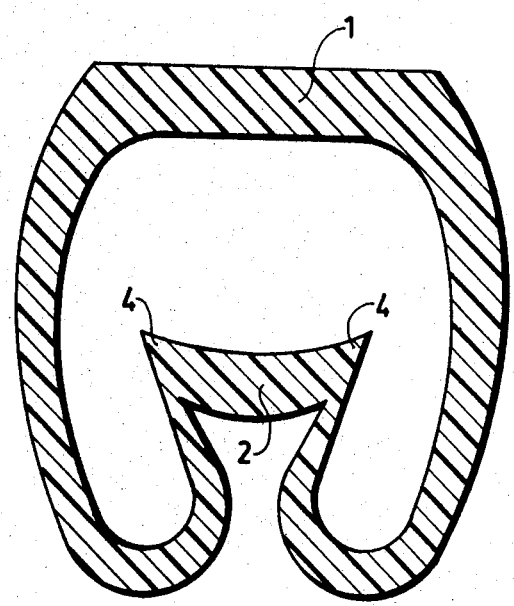

FIG. 6 shows still another embodiment of the present invention in which the ridges or projecting corners 4 merge smoothly into the central top of the loop to form a smooth valley or saddle-like seat. This design offers the same lateral support for small conductors as the previous designs. On larger conductors the ridges turn inwardly to, inessence, wrap around the bottom of the conductor.

As was previously pointed out, the ultimate limit in the use of the sleeves, such as those shown in FIGS. 1a and 1b, has been the provision of four sizes of sleeve to cover cable diameters between 23 mils and five-eighths inches. However, it has been found in accordance with the present invention that the same cable diameter range may be easily covered by only three sizes of sleeve. Additionally, and irrespective of the relative sizes of cables which can be marked in accordance with the present invention, the sleeves of the present invention have a substantially improved resistance to rotation, radial displacement or longitudinal displacement on the cable on which they are mounted.

It is to be recognized that while the specification and drawings have described and shown certain specific embodiments of the present invention, the invention is to be limited only in accordance with the appended claims, since one skilled in the art can conceive of many modifications and variations without departing from the generic concept of providing a plurality of ribs, ridges, bars, flanges or other inwardly oriented projections on an expansible marking sleeve. For example, while the drawings show the longitudinally disposed flanges extending along the entire length of a sleeve, the ridges may be discontinuous and still accomplish substantially the same purposes. On the other hand, ease of manufacture dictates continuous extrusion and cutting the extrusion in sections, in which case the flanges will be continuous. The projections may also be in the shape of cones or discontinuous in some other way and they may be oriented in a direction other than parallel to the longitudinal axis as for example, helically around the sleeve. The primary requirement is that, when the marking sleeve is mounted on a thin wire or the like and its fold or folds are not stretched the upper surface of the lower portion forms a saddle-like seat offering lateral support. Obviously, other modifications can be made by one skilled in the art.

I claim:

1. An expansible sleeve-type marking device for wires, cables, conductors and the like, comprising:
 a. an annular main body portion;
 b. an exterior surface adapted to receive a marking symbol;
 c. a laterally expansible portion formed in at least one part of the side of said body portion;
 d. said expansible portion, including, at least one fold extending laterally from said side of said body portion; and
 e. at least one flange extending inwardly from the interior of the expansible portion.

2. An expansible sleeve-type marking device for wires, cables, conductors and the like, comprising:
 a. an annular main body portion;
 b. an exterior surface adapted to receive a marking symbol;
 c. a laterally expansible portion formed in at least one part of the side of said body portion;
 d. said expansible portion including at least one fold extending laterally from said side of said body portion; and
 e. a pair of projections extending inwardly from the interior wall of said expansible portion;

3. A marking sleeve as claimed in claim 2, wherein the projections define a valley.

4. A marking device as claimed in claim 3, wherein the projections comprise two ribs extending longitudinally of the sleeve.

5. A marking device as claimed in claim 4, wherein the ribs project from the wall of the sleeve at the innermost portion of the fold.

6. A marking device as claimed in claim 4, wherein the ribs are arranged to extend towards the wall opposite their points of attachment when the expansible portion is unstretched.

7. A marking device as claimed in claim 4, wherein the ribs are arranged to extend towards the wall opposite their points of attachment when the expansible portion is stretched.

8. A marking device as claimed in claim 3, wherein the projections are substantially L-shaped in cross section.

9. A marking device as claimed in claim 4, wherein two pairs of ribs project from the wall of the sleeve at the innermost portion of the fold.

10. A marking device as claimed in claim 3, wherein the expansible portion of the sleeve has a plurality of longitudinal folds each being formed at its innermost portion with at least one longitudinally extending rib.

11. A marking device in accordance with claim 4, wherein the ribs project inwardly toward the center and flare away from one another to form a broad-based V.

12. A marking device in accordance with claim 4, wherein the flanges project inwardly toward the center of the sleeve and thence outwardly toward the walls of the sleeve to form a generally L-shaped cross section.